June 28, 1938.  E. CURRAN  2,122,313

BOUNDARY BEACON LIGHT FOR AIRPORTS

Filed Jan. 9, 1936   2 Sheets-Sheet 1

INVENTOR
EUGENE CURRAN
By Norris & Bateman
ATTORNEYS

June 28, 1938.  E. CURRAN  2,122,313
BOUNDARY BEACON LIGHT FOR AIRPORTS
Filed Jan. 9, 1936  2 Sheets-Sheet 2
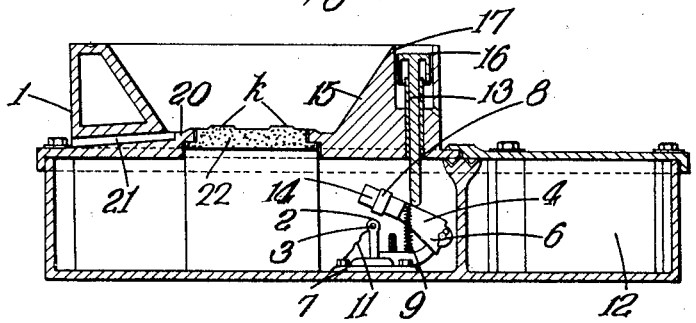
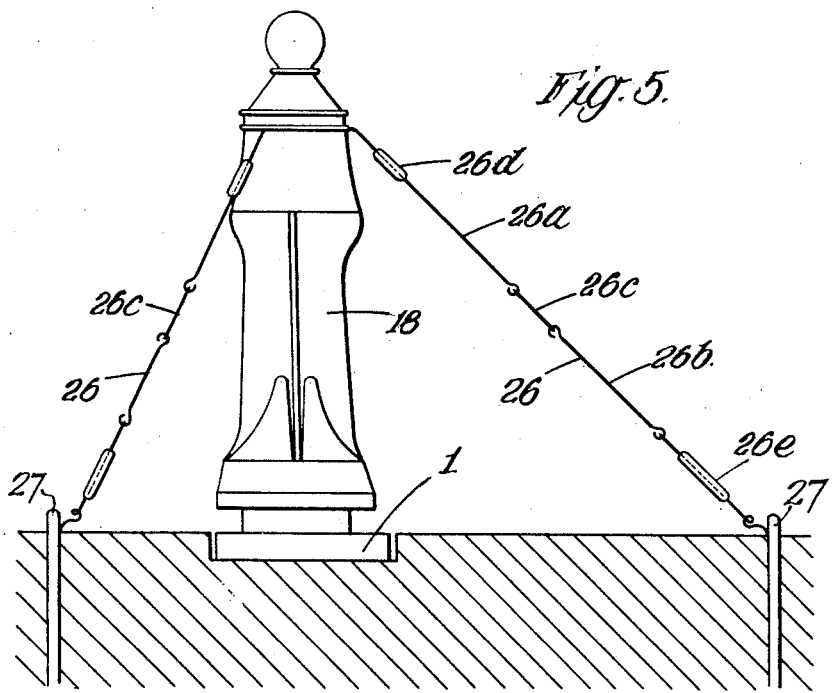
INVENTOR
EUGENE CURRAN
By Norris & Bateman
ATTORNEYS Patented June 28, 1938

2,122,313

UNITED STATES PATENT OFFICE 2,122,313

BOUNDARY BEACON LIGHT FOR AIRPORTS

Eugene Curran, Cardiff, Wales

Application January 9, 1936, Serial No. 58,407
In Great Britain November 21, 1935

9 Claims. (Cl. 240—1.2)

This invention relates to boundary beacon lights for airports and more particularly to the type which comprises a pillar so mounted on a base member that when struck by an aeroplane or other vehicle it falls over, thereby minimizing the possibility of serious damage occurring to the beacon or the vehicle. Such beacons are usually provided with electrical light sources, the current being supplied through suitable contact members in the base member which are adapted to engage contacts in the bottom of the pillar when the latter is in position on the base.

An object of the present invention is to provide a beacon in which the dangers of electric shock and the likelihood of electrical short circuits when the pillar is upset are reduced.

A further object of the invention is to provide a beacon which will remain upright under heavy wind forces and yet will be upset easily under the impact of a vehicle, for example an aeroplane.

The light beacon according to the invention comprises a pillar which is provided with at least one electrical contact on its under surface and a base having a corresponding insulated electrical contact adapted to be engaged by a contact on the pillar in the upright position of the latter, electrical switching means in the circuit of each contact on the base, resilient switch actuating means tending to maintain the circuit of each base contact open and means operable by the pillar in its upright position to close the switching means.

To ensure that the pillar will not be blown over by a heavy wind, the pillar may be guyed. The invention may accordingly provide guys which each comprise a weak link which, although capable of withstanding heavy wind loads, will fail when the pillar is struck by an aeroplane and permit the pillar to fall, the guys preferably being normally under tension.

The invention is preferably applied to beacons having a male or female bottom portion on the pillar adapted to seat in or on a corresponding female or male portion on the base member.

In a preferred construction the pillar is provided with a conical projecting portion which is adapted to seat on a corresponding conical recess in the base, the two seating portions in the pillar and the base making seating contact over a line near the top of the base.

The disposition of the seating portions may be reversed however, the male portion being arranged on the base and the recess on the pillar.

The invention is illustrated by way of example in the accompanying drawings in which—

Fig. 2 is a sectional side elevation of the base.

Fig. 5 is a general view of the assembled beacon with guys.

In the drawings:—

Figure 1:
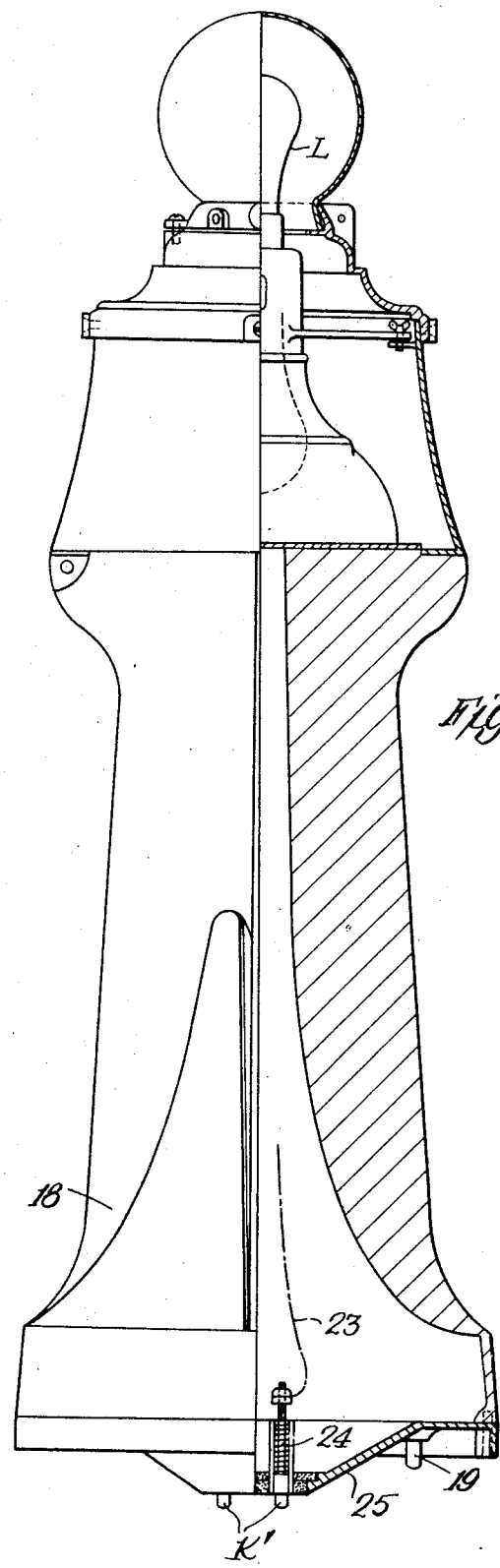
Fig. 1 is a side elevation, partly in section, of the pillar.
Figure 3:
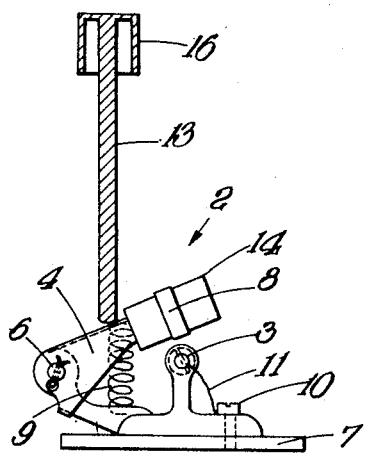
Fig. 3 is a side view of the base switch.
Figure 4:
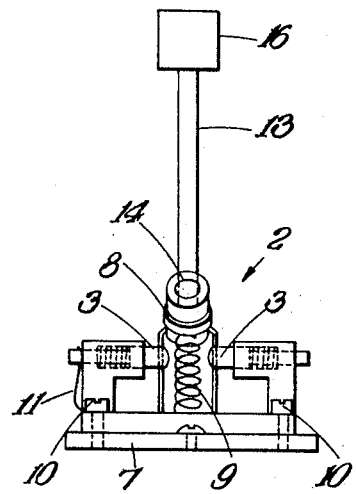
Fig. 4 is an end view of the switch shown in Fig. 3.

The base 1 is in the form of a box which contains two single pole switches 2, one of which is shown, and, if desired, fuses (not shown). The switch 2 comprises two oppositely disposed spring urged plungers 3, 3 between which a spring loaded member 4 is adapted to be forced, thereby completing the circuit to the base contacts $k$, $k$ in which circuit the two plungers 3, 3 are arranged. The spring loaded member 4 is pivoted to the insulated base 7 of the switch about a pin 6 the axis of which is parallel to the longitudinal axis of the two plungers 3, 3 and comprises a barrel 14 having an insulated rotatable ring 8 of conducting material thereon which when the barrel is depressed rides between and bridges the plungers 3, 3 to complete the circuit. The barrel 14 is normally urged by the spring 9 out of contact with the plungers 3, 3.

It will be understood that one plunger 3 is connected to the supply mains and the other plunger is connected to one of the contacts $k$ in the base by suitable leads not shown. Terminal posts 10 on the switch base are provided for the connections to the mains and the base contacts and these posts are connected, as by a lead 11, to the respective plunger 3.

Sealing boxes 12 are provided for leading in the main supply cables which are sealed therein in known manner.

Slidably mounted in a cylindrical guide 17 in the top of the box like base 1 adjacent to the female seating portion 15 thereof is a rod or pin 13 formed with a piston head 16 the lower end of the rod 13 abutting on the member 4. The bottom of the pillar 18 is provided with a projecting pin or like member 19 adapted, when the pillar is placed in position on the base 1, to abut on the sliding rod 13 and force it downwards thereby operating the switch to complete the electric circuit to the respective contact member $k$ in the base. When the pillar 18 is removed as by tilting, the barrel 14 of the switch moves upwardly under the action of the spring 9 out of contact with the plungers 3, 3 to break the circuit. It will be noted that the ring 8 is rotatably mounted on the barrel 14. If desired, the rod 13 may project above the top of the base member so that when the pillar is placed thereon it forces the rod down as explained above. In this case the pin 19 on the pillar is omitted.

A drain channel 20 is formed in the base, opening to an outlet 21, to prevent rain from reaching the contacts $k$ which are, of course, suitably mounted in an insulating material 22.

The contacts $k_1$, $k_1$ of which one is shown, on the under surface of the pillar 18 are suitably connected as by a lead 23, to the lamps L in the head thereof. A spring 24 is provided to urge each contact $k_1$ against the corresponding base contact $k$.

The conical projecting portion 25 on the bottom of the pillar is arranged to seat on the conical recess 15 in the base and to make contact therewith at the upper part of the latter. Contact does not occur over an extensive area but, due to the different angles of the conical portion 25 and conical recess 15 as will be apparent from Figs. 1 and 2, is limited to, more or less line contact so that the male and female parts do not interfere when the pillar is tilted under a blow and prevent the latter falling freely.

In order to prevent the pillar from being upset by a strong wind or gale, it is supported by the arrangement shown in Fig. 5.

In this arrangement three supporting guys 26 are provided to support the pillar, each guy being suitably attached at one end to the top of the pillar and at the other end to a ground pin 27. Each guy 26 is divided into two portions 26a, 26b which are joined together by a weak link 26c of material weaker than that of the remainder of the guy. A suitable material for the weak link is copper. Also included in the length of each guy is a screw threaded sleeve 26d of known character which joins two divided ends of the guy which are, therefore, screw-threaded or have, fixed to them, screw-threaded attachments which engage in the sleeve 26d. Also included in the length of the guy is a spring balance 26e. By screwing the sleeve 26d the tension in the guy may be adjusted, the valve being checked by the spring balance 26e.

When the beacon is struck by, say, an aeroplane, one or two of the guys will break at the weak link and the remaining guy or guys will swing the pillar over quickly out of the way of the aeroplane, this greatly minimizing the risk of serious damage to the latter.

Instead of conical seating surfaces, ball and socket surfaces may be formed on the pillar and the base.

A double pole or two single pole switches may be arranged in the base in place of the single pole switch described.

Having thus described the nature of the said invention and the best means I know of carrying the same into practical effect, I claim:—

1. A light beacon particularly adapted for use on aeroplane landing grounds, which comprises a pillar which is provided with at least one electrical contact on its under surface and a base having a corresponding insulated electrical contact adapted to be engaged by a contact on the pillar in the upright position of the latter, a moving switch contact member in the circuit of each insulated contact on the base, a spring connected to bias the member to open the circuit of the base contacts, a slidable plunger in the base abutting on the moving contact member and a member on the pillar arranged to engage the plunger and force the moving contact member into position to close the circuit of the base contacts when the pillar is upright on the base.

2. A light beacon, particularly adapted for use on aeroplane landing grounds, which comprises a pillar which is provided with at least one electrical contact on its under surface and a base having a corresponding insulated electrical contact adapted to be engaged by a contact on the pillar in the upright position of the latter, electrical switching means in the circuit of each insulated contact on the base, said switching means comprising two oppositely disposed spaced spring pressed electrical contacts, a moving contact member, and a ring contact rotatably mounted on said contact member and insulated therefrom, a spring connected to bias the contact member away from said contacts, a slidable plunger in the base abutting on the contact member and a member on the pillar adapted to engage the plunger and force the ring contact between the contacts when the pillar is upright on the base.

3. A light beacon particularly adapted for use on aeroplane landing grounds which comprises a pillar having a conical seat on its under surface, a base for supporting the pillar which has a complementary conical seat for supporting the pillar base, the seat on the pillar and the seat on the base seating one on the other over a narrowly limited annular area, at least one insulated electrical contact on the base adapted to be engaged by a contact on the pillar, electrical switching means in the circuit of each insulated contact on the base, said switching means comprising a moving contact member, a spring connected to bias the member to open the circuit of the base contacts, a slidable plunger in the base abutting on the moving contact member and a member on the pillar arranged to engage the plunger and force the moving contact member into position to close the circuit of the base contacts when the pillar is upright on the base.

4. A light beacon, particularly adapted for use on aeroplane landing grounds, which comprises a pillar which is provided with at least one electrical contact on its under surface and a base having a corresponding insulated electrical contact adapted to be engaged by a contact on the pillar in the upright position of the latter, electrical switching means in the circuit of each insulated contact on the base, resilient switch actuating means tending to maintain the switching means in the position to open the circuit of the base contacts, means operable by the pillar in its upright position on the base to move the switching means to close the circuit of the base contacts, and guys supporting the pillar which each includes a link of material weaker than that of the remainder of the guy.

5. A light beacon, particularly adapted for use on aeroplane landing grounds, which comprises a pillar which is provided with at least one electrical contact on its under surface and a base having a corresponding insulated electrical contact adapted to be engaged by a contact on the pillar in the upright position of the latter, electrical switching means in the circuit of each insulated contact on the base, resilient switch actuating means tending to maintain the switching means in the position to open the circuit of the base contacts, means operable by the pillar in its upright position on the base to move the switching means to close the circuit of the base contacts, guys supporting the pillar which each includes a link of material weaker than that of the remainder of the guy, and means in each guy for tensioning said guy.

6. A light beacon, particularly adapted for use on aeroplane landing grounds, which comprises a pillar which is provided with at least one electrical contact on its under surface and a base having a corresponding insulated electrical contact adapted to be engaged by a contact on the pillar in the upright position of the latter, electrical switching means in the circuit of each insulated contact on the base, resilient switch actuating means tending to maintain the switching means in the position to open the circuit of the base contacts, means operable by the pillar in its upright position on the base to move the switching means to close the circuit of the base contacts, guys for supporting the pillar, a link of material in each guy weaker than that of the remainder of the guy, means in each guy and forming part thereof for tensioning said guy, and tension indicating means included in each of said guys.

7. A light beacon, particularly adapted for use on aeroplane landing grounds, which comprises a pillar having a male conical seat on its under surface, a base for supporting the pillar which has a complementary female conical seat for supporting the pillar base, the cone angle of the seat on the pillar being greater than the cone angle of the seat on the base so that seating of the pillar on the base takes place over a narrowly limited annular area, and guys for supporting the pillar which each includes a link of material weaker than that of the remainder of the guy.

8. A light beacon particularly adapted for use on aeroplane landing grounds, which comprises a pillar having a male seat on its under surface, a base for supporting the pillar which has a complementary female conical seat for supporting the pillar base, the cone angle of the seat on the pillar being greater than the cone angle of the seat on the base so that seating of the pillar on the base takes place over a narrowly limited annular area, guys for supporting the pillar which each includes a link of material weaker than that of the remainder of the guy, and means in each guy for tensioning said guy.

9. A light beacon, particularly adapted for use on aeroplane landing grounds which comprises a pillar having a conical seat on its under surface, a base for supporting the pillar which has a complementary conical seat for supporting the pillar base, the seat on the pillar and the seat on the base seating one on the other over a narrowly limited annular area, guys for supporting the pillar, a link of material in each guy weaker than that of the remainder of the guy, means in each guy and forming part thereof for tensioning said guy, and tension indicating means included in each of said guys.

EUGENE CURRAN.